March 27, 1934.  R. T. BRIZZOLARA  1,952,414
METHOD AND APPARATUS FOR COOLING AIR
Filed Aug. 13, 1931  2 Sheets-Sheet 1
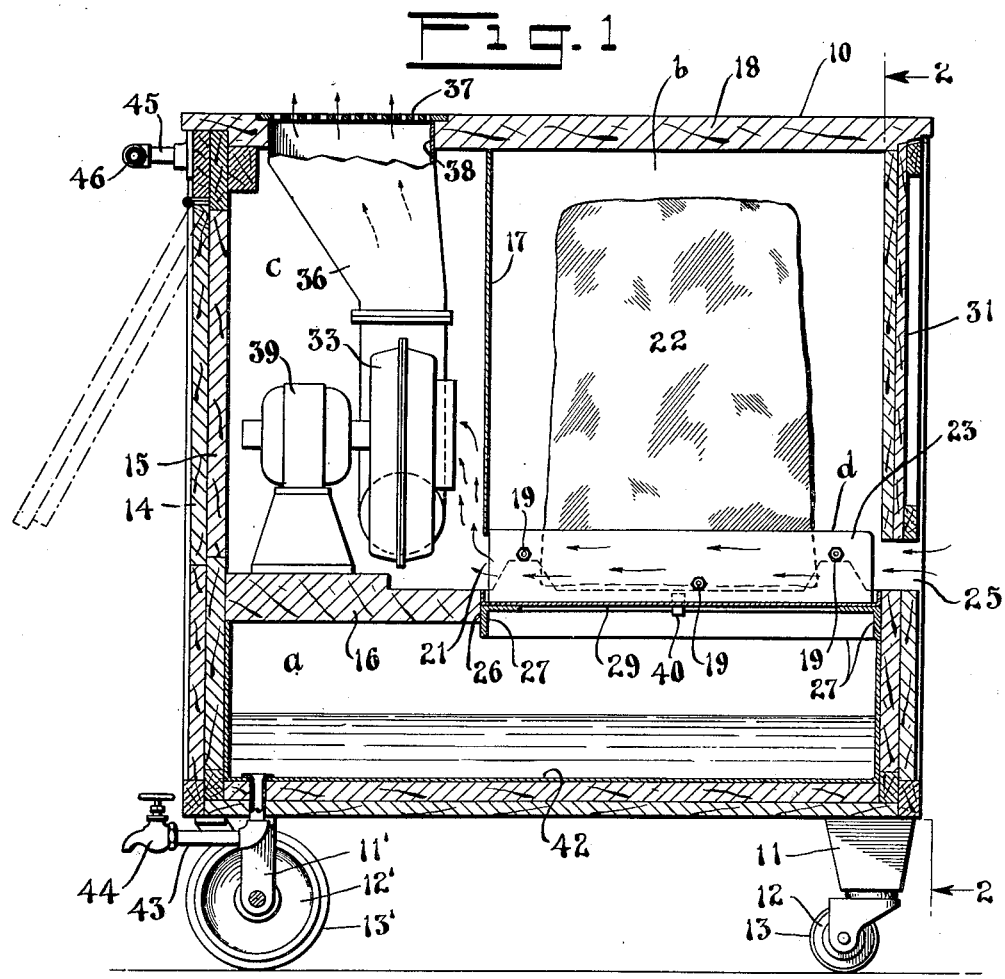
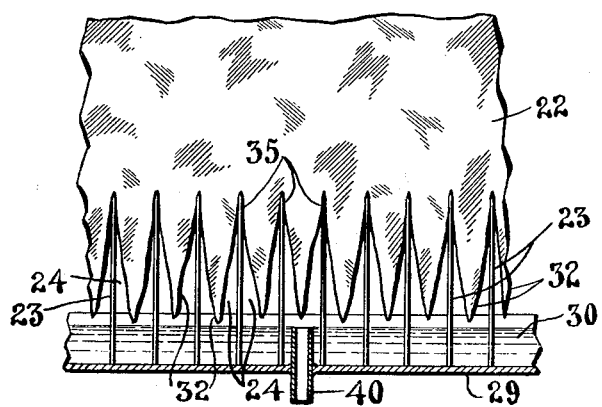
INVENTOR
Robert T. Brizzolara
BY
ATTORNEY March 27, 1934.  R. T. BRIZZOLARA  1,952,414
METHOD AND APPARATUS FOR COOLING AIR
Filed Aug. 13, 1931  2 Sheets-Sheet 2
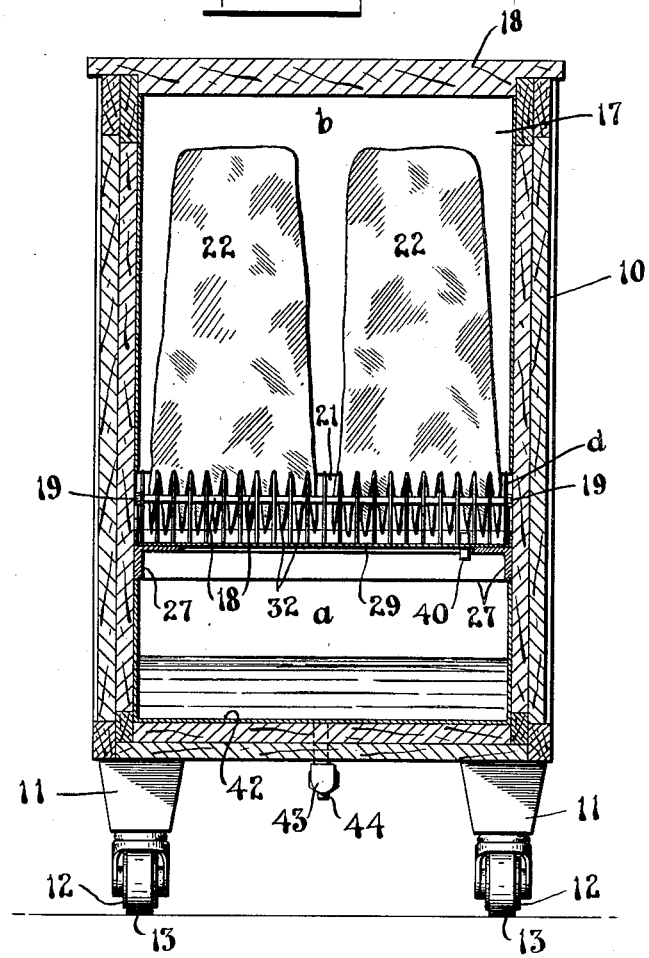
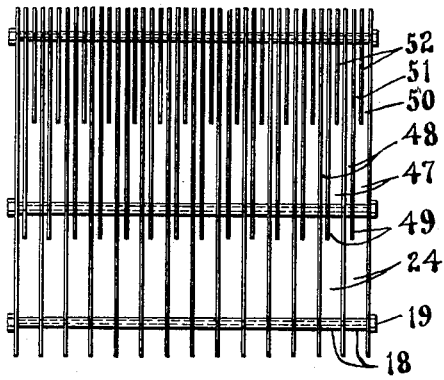
INVENTOR
Robert T. Brizzolara
BY
his ATTORNEY

UNITED STATES PATENT OFFICE 1,952,414

METHOD AND APPARATUS FOR COOLING AIR

Robert T. Brizzolara, New Dorp, N. Y.

Application August 13, 1931, Serial No. 556,812

9 Claims. (Cl. 62—133)

This invention relates to a method and apparatus for cooling air in rooms, for instance hotel rooms, hospital rooms, apartments, and the like, and for use in such other places and capacities where it may be desired to cool and extract moisture from the atmosphere during periods of high temperature.

Another object of the invention is to provide an apparatus or a machine in which a grid or the like supports one or more blocks or pieces of ice in an ice chamber, the improvements being more particularly related to an arrangement in which the ice rests directly upon metallic vertically disposed grid plates or fins so that, due in part to the weight of the superimposed block of ice and in part to the air warmed grids melting into the block of ice, finely divided sheets of ice will be produced between the grid plates.

The grid mechanism referred to is arranged in a box structure in a manner in which the warm atmosphere of the room can be drawn through the longitudinal channels formed by the grid plates and hence in direct contact with the cooled grid plates and the divided sheets of ice hanging downwardly from the ice block into such channels. The metallic plates of the grid abstract heat from the air passing through the channels and transmit the abstracted heat to the ice for melting the ice. The passing air is thus cooled by the grid plates and by the melting sheets of ice therebetween. By my arrangement, the ice melts quite rapidly and the amount of ice surface exposed for contact with the air is augmented.

According to another feature of my invention, a pan containing a definite level of water is located below the ice. The lower portions of the metallic grid plates project into the water within the pan. The water from the melted ice drips into this pan and the heat abstracted by the grid plates from the air is transmitted, not only to the ice, but also to the water within the pan. The net result of the heat exchange between the ice water and the air through the media of the grid plates is to effect a further economy in the use of ice for cooling the air. The thin sheets of ice melt rapidly in the air channels for quick cooling of the air which is drawn through the channels and the metallic plates or fins of the grid constitute media for abstracting the heat of the air and for transmitting the abstracted heat both to the ice and ice water which drips from the ice.

While the air is being cooled, the dust and impurities therein contained are also removed to a large degree through contact by the air with the grid plates, the melting ice, the ice water, and by the condensed moisture dripping from the melting ice.

With the foregoing and other objects in view, the invention consists in the method steps and in the construction and relative arrangement of parts so combined as to coact and cooperate with each other in the accomplishment of the results herein contemplated, and comprises in its present evolvement the simple and practical example illustrated in the accompanying drawings, wherein similar reference characters designate corresponding parts throughout the several views, and in which:—

Figure 1 represents a vertical sectional view through a portable apparatus embodying my invention;

Fig. 2 represents an elevation and section, more or less diagrammatic in character, showing the finely divided sheets of a superimposed block of ice hanging within the channels of the grid and above the water pan which receives the lower portions of the grid plates;

Fig. 3 is a vertical sectional view taken on the line 2—2 of Fig. 1; and

Fig. 4 is a top plan view showing another form of the grid device.

By referring to the drawings, it will be noted that the invention is disclosed as embodied in a refrigerator or receptacle 10 which is of a portable character, the same being mounted at the front upon suitable legs 11 in the lower ends of which are secured suitable rollers or casters 12 provided with rubber tires 13, and at the rear upon a swivelly engaged element 11' carrying a caster 12' equipped with a rubber tire 13'. The purpose of mounting the cooling apparatus upon rubber tired rollers or casters is, of course, to enable the apparatus to be readily moved about a room or from one room to another with ease and with a minimum of noise. The receptacle may be made of any suitable or approved material and in any suitable or approved manner. Preferably, the walls 14 of the receptacle are made of wood, and these walls are provided on the inside with a lining medium 15 preferably consisting of material commercially known as celotex.

The interior of the receptacle may be suitably divided into compartments a, b and c by means of a horizontal partition 16 and a vertical partition 17, the latter consisting preferably of galvanized iron or the like and dividing off the compartment b, which represents the ice chamber, from the compartment c, which represents a plenum chamber. The partition 17 is provided with an opening 21 in the lower portion thereof, adjacent the partition 16.

For the support of the ice blocks as 22 within the compartment b, I provide a grid or grating which is designated in general by the reference character d and consists of a series of longitudinal vertically disposed metallic plates 23 alternating with channels 24. These plates are connected to form a rigid grid structure and they extend from an inlet air opening 25 at the front of the receptacle to the air opening 21. The channels 24 between the grid plates provide for the passage of air from the opening 25 to the opening 21 and hence to the chamber c. In the present embodiment the grid plates are bolted together by means of sleeve-like spaces 18 on through bolts 19 which extend transversely through the grid plates well below the top edges thereof. In the horizontal partition 16 below the chamber b is an opening 26, and located in this opening are angle-bars 27 which are supported by the walls of the receptacle. Supported on the angle-bars 27 is an ice water pan 29 which fits within the opening 26. The grid plates rest upon the bottom of the pan 29 and the through bolts 19 adjacent the end of the grid structure may rest upon the top edges of the pan as shown in Figs. 1 and 2.

Above the inlet opening 25, the front of the receptacle 10 consists of a hinged door 31 adapted to be opened for the installation of the ice blocks. As represented in the drawings, the ice blocks 22 are superimposed upon the vertically disposed metallic grid plates, so that as the ice melts the relatively sharp top edges of the plates will act upon the ice and cut into the body thereof to produce finely divided portions or sheets 32 of ice which hang or depend in the channels 24 between the grid plates. The warm air to be cooled is drawn or sucked from the room through the inlet opening 25, channels 24, and opening 21 by a suction blower 33 located in the compartment c and having a suction inlet therein located at a level above that of the opening 21. As the warm air is drawn through the channels 24 it makes direct contact with the finely divided portions or sheets of ice 32 and as well with the metallic plates of the grid. The warm air, which is thus drawn through the channels, naturally melts the hanging sheets of ice 32 and causes the block of ice to constantly settle downwardly as the relatively sharp upper edges of the plates cut into the body of the ice. In this way, the body of the ice is constantly settling so that sheets of ice as 32 are constantly produced in the channels for cooling the air. Within the pan 29, water 30 is maintained at a definite level well above the lower edges of the grid plates as best shown in Fig. 3. The metallic grid plates abstract the heat from the air and transmit the abstracted heat to the sheet portions 32 as well as to the body of the ice, and also to the water 30 contained within the pan 29 into which falls the drip bulbs or condensed moisture resulting from the melting of the ice. The upper and the lower longitudinal portions of the grid plates are, by this arrangement, constantly in direct contact with a cooling medium so that the plates are kept in a comparatively cool condition for readily abstracting the heat content of the air. Manifestly, the cool drip bulbs and condensed moisture from the ice keeps the water in the pan comparatively cool. The heat transmitted by the grid plates to the ice causes a rather rapid melting of the sheet portions 32 with the channels, especially since the said sheet portions have a relatively long contact zone as at 35 (Fig. 3) with the plates. As the plates are kept comparatively cool and as the sheet portions of ice 32 within the channels are melted rather rapidly, the streams of air flowing within the channels and in direct contact with the plates and with the sheets of ice rapidly give up their heat so as to become comfortably cool.

In the present embodiment the blower is represented as exhausting the cooled air through an outlet pipe 36 which extends to a grille 37 spanning an outlet opening 38 in the top of the receptacle. The blower may be operated from any suitable source of power; in the present instance an electric motor 39 is shown in the compartment c for the operation of the blower.

The pan 29 is provided with an overflow pipe 40 which discharges into a large pan or reservoir 42 located within the compartment a. The said pan 42 should be of a size sufficient to accommodate all the water resulting from the melting of all the ice which the compartment b is capable of holding. For the pan 42 there is provided a drain pipe 43 and a suitable compression faucet 44 by means of which to permit the discharge, when desired, of the water from the reservoir.

The apparatus of my invention not only cools and conditions the air uniformly while ice remains, but it also serves as means whereby to wash the air, since the dust and impurities held in suspension in the air are removed through contact of the air with the grid plates and ice and hanging ice sheet portions, and further by the drippings and condensed moisture which fall from the ice through the air into the pan 29.

It is in place to state here that in order to effectively cool the air and reduce its wet bulb temperature to the greatest extent possible, I have found that a definite proportion between grid plate thickness and depth must be maintained. If the plate is too thin the capacity for heat conduction is limited and the plate cannot abstract the heat from the air and conduct it to the ice. When this occurs a portion of the air passes through the grid unaffected in temperature and long plates of ice or ice sheets do not form. Another function of heat conductance besides area, as just described, is the metal used for the grid. It is a known fact that silver is a better heat conductor than aluminum; aluminum is better than copper; copper better than brass; and brass about twice as effective as iron or steel. Therefore, in designing a grid, due regard must be taken of the metal to be used for proper proportioning of the grid plate heat conductors. From a commercial viewpoint, I have found aluminum and brass to have the most practical advantages. In using steel I found that the thickness of the plates forming the grid had to be made exceedingly great, which restricted free air passages and was too heavy.

For convenience in moving the wheeled apparatus from room to room or over the floor of a room and to the location where the air may be cooled to the best advantage, I provide at the rear of the receptacle and adjacent the top thereof one or more projecting members 45 for the support of a horizontal pipe handle bar 46.

In Fig. 4, there is disclosed another form of the grid structure in which, for the central portion of the structure, the channels 24 are subdivided into channels 47 and 48 by the addition of grid plates 49; and in which, for the rear of the structure, the channels 47 are subdivided into channels 150

50 and 51 by the addition of other grid plates 52. By thus increasing the number of channels while at the same time narrowing them cross sectionally, the number of the ice sheet portions is correspondingly increased and at the same time correspondingly thinned, so as to increase the amount of ice surface for contact by the air streams. In this connection it will be noted that the increase in the number of ice sheet portions is from the front to the rear of the structure or in the direction of the passage of the air through the channels so that as the streams of air are cooled they will be subdivided into smaller streams for greater contact with hanging sheet portions of smaller cross dimension. In this way, the air can be readily, uniformly and thoroughly cooled while at the same time economizing in the use of the ice.

The air as it passes through the grid from front to rear is cooled. The amount of ice meltage is greatest in front where the mean temperature difference between the air and cooled surfaces is greatest. In order to keep the rate of ice meltage constant from front to rear, it is necessary as the air is progressively cooled along its travel, to progressively increase the number of grid plates and sheets of ice. By progressively increasing the amount of cooling surface I have been able to bring about a quite uniform rate of ice meltage throughout the grid area, which is evidenced by the block melting down flat. This feature of uniform ice meltage prevents falling and tumbling of the ice, insures my maintaining a uniform amount of cooling of the air during the life of any existent ice in the chamber. In other words, so long as ice exists in the chamber it is uniformly melted off the bottom of the block which always presents the same amount of ice surface and cooled grid surface.

The portable apparatus of my invention may be conveniently made of a capacity to contain 300 or more pounds of ice and the melted water from the same. It has been found in practice that a unit having this capacity will with an average melting of about ninety pounds of ice per hour, keep comfortably cool a room having a dimension of about 6,000 cubic feet and when used with a nominally rated 750 cubic foot blower.

It will now be apparent that I have devised a novel and useful cooling apparatus which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

I claim:—

1. Means for cooling air comprising a grid composed of metallic plates forming channels for the air to be cooled, said plates being mounted to support a block of ice thereon and having edges for penetrating the ice to produce thereby thin sheets of ice depending within the channels for contact by the air therein, a power driven blower for causing the air to be drawn through said channels, a vessel for receiving the drippings from the melted ice, said plates extending into the drippings collected in said vessel.

2. Means for cooling air comprising a grid composed of metallic plates forming channels for the air to be cooled, said plates being mounted to support a block of ice thereon and having edges for individually penetrating the ice to produce thereby thin sheets of ice depending within the channels, power operated means for causing a flow of air through the channels to contact the plates and ice sheets within the channels for abstracting the heat from the air, and means to receive the cooled air.

3. A cooling apparatus having an ice chamber, a grid including metallic vertically disposed plates for supporting the ice in the chamber and forming channels for the passage of air to be cooled, said plates being adapted to transmit heat from the air to the ice and to individually penetrate the ice to produce sheets depending into the channels, a warm air inlet leading to one end of the channels, a cool air discharge leading from the opposite end thereof, a plenum chamber, and means comprising a motor-operated device for causing the air to move through said inlet channels and discharge into the plenum chamber.

4. A cooling apparatus having an ice chamber, a grid including metallic vertically disposed plates for supporting the ice in the chamber and forming channels for the passage of air to be cooled, said plates being adapted to transmit heat from the air in the channels to the ice and to sever the ice into sheets depending into the channels, means for drawing air to be cooled through the channels to contact the ice sheets therein, and a heat abstracting medium engaging the plates at a point opposite to the support of the ice by the plates.

5. A portable cooling appaartus comprising a wheeled case having therein a chamber for accommodating a block of ice, a support for the block of ice comprising a metallic grid the plates of which form channels underneath the block of ice for the passage of air to be cooled and constituting media for transmitting heat from the air to the ice for melting the ice, said plates being vertically disposed to cut individually into the body of the ice resting thereon, to produce thereby sheet portions of ice depending from the block within the channels, means forming circulation connections for passing a current of air to be cooled through said channels, and power-operated means for passing a current of air through said connections and channels.

6. In a cooling apparatus, a chamber for accommodating a block of ice, a support for the block of ice comprising a metallic grid the plates of which form channels underneath the block of ice for the passage of air to be cooled and constituting media for transmitting heat from the air to the ice for melting the ice, said plates being disposed vertically to cut into the block of ice resting thereon, to produce thereby sheet portions of ice depending from the block within the channels, means for drawing air to be cooled through said channels, and a vessel containing a regulated amount of water in which the lower portions of said plates are received to transmit some of the heat of the plates to the water.

7. In the method of melting a block of ice at a uniform rate to produce a substantially constant amount of cooling irrespective of the reduction in the mass of the block, the steps which consist in subjecting the block of ice to the action of heat transmitting supports for the block, the ice itself being melted thereby and being penetrated by the supports so as to produce jutting fragments having the same amount of air cooling surfaces and to maintain definite areas of wet and dry bulb temperature, and simultaneously subjecting the supports to the influence of a cooling medium sufficiently to regulate heat transmission to the block of ice and hence the melting thereof.

8. In an air cooling system, an arrangement of single vertically disposed metallic heat transmitting plates adapted to support a block of ice thereon and spaced to provide open spaces open at the top to the ice to permit downward movement of sheets of ice in the spaces intervening between the single plates, all of said plates being characterized by consisting of thin blade bodies having sharp edged tops to individually penetrate the ice block and reduce opposition to the movement downwardly of the ice sheets between the blade bodies under settling of the ice block due to penetration while at the same time hastening melting of the ice sheets at the sides of the blade bodies and the creation of longitudinal air crevices between the opposite sides of each blade body and the ice sheets adjacent thereto, and means for passing air to be cooled through said crevices to increase the ice melting rate and surface for quick cooling of the passing air.

9. In an air cooling system, the steps of penetrating a block of ice by a heat-transmitting medium so as to produce air crevices and jutting fragments having the same amount of air cooling surfaces and to maintain definite areas of wet and dry bulb temperature, simultaneously maintaining through said crevices and in direct contact with said definite temperature areas a constant flow of air to be cooled, and subjecting the heat-transmitting medium itself to the action of a cooling medium other than the ice for regulating the amount of heat being transmitted to the ice.

ROBERT T. BRIZZOLARA.